(12) United States Patent
Mott et al.

(10) Patent No.: US 9,793,024 B2
(45) Date of Patent: Oct. 17, 2017

(54) ELECTRICALLY CONDUCTIVE COATING MATERIALS, ELECTRICALLY CONDUCTIVE COATING SYSTEMS, AND METHODS INCLUDING THE SAME

(71) Applicant: The Boeing Company, Huntington Beach, CA (US)

(72) Inventors: Russell Patrick Mott, Calabasas, CA (US); Oleg Efimov, Thousand Oaks, CA (US); Andrew Paul Nowak, Los Angeles, CA (US); David L. Hammon, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 14/805,788

(22) Filed: Jul. 22, 2015

(65) Prior Publication Data

US 2017/0025198 A1    Jan. 26, 2017

(51) Int. Cl.
| | |
|---|---|
| *H01B 1/20* | (2006.01) |
| *H05K 1/05* | (2006.01) |
| *B64C 1/12* | (2006.01) |
| *C09D 5/24* | (2006.01) |
| *B05D 3/12* | (2006.01) |

(52) U.S. Cl.
CPC .................. *H01B 1/20* (2013.01); *B05D 3/12* (2013.01); *B64C 1/12* (2013.01); *C09D 5/24* (2013.01)

(58) Field of Classification Search
CPC ............... H01B 1/20; H01B 1/14; C09D 5/24
See application file for complete search history.

(56) References Cited

U.S. PATENT DOCUMENTS

| | | | | | |
|---|---|---|---|---|---|
| 2001/0048098 | A1* | 12/2001 | Ducros | ..................... | H01B 1/20 252/500 |
| 2011/0315818 | A1* | 12/2011 | Chao | ..................... | B64D 37/32 244/1 A |
| 2012/0070621 | A1* | 3/2012 | Nukui | ..................... | B82Y 10/00 428/156 |
| 2012/0258323 | A1* | 10/2012 | Brown | ................... | B64D 45/02 428/457 |

(Continued)

*Primary Examiner* — Hoa C Nguyen
*Assistant Examiner* — Amol Patel
(74) *Attorney, Agent, or Firm* — DASCENZO Intellectual Property Law, P.C.

(57) ABSTRACT

Electrically conductive coating materials, electrically conductive coating systems, and methods including the same are disclosed herein. The electrically conductive coating systems include an electrically conductive base layer, a dielectric layer, and a plurality of electrically conductive elements that are embedded within the dielectric layer. The electrically conductive coating materials include a liquid dielectric and a plurality of electrically conductive elements that are suspended within the liquid dielectric. The methods include applying an electrically conductive coating material to an electrically conductive base layer and curing the electrically conductive coating material to define the electrically conductive coating system. The electrically conductive elements are defined by an elongate body that has a nonlinear conformation and is shaped to extend across at least 80% of an average thickness of the dielectric layer and/or to project from the electrically conductive base layer at least 80% of the average thickness of the dielectric layer.

20 Claims, 5 Drawing Sheets

(56) References Cited

U.S. PATENT DOCUMENTS

| | | | | |
|---|---|---|---|---|
| 2015/0083961 A1* | 3/2015 | Mrozek | ............... | C09K 5/14 |
| | | | | 252/74 |
| 2015/0282312 A1* | 10/2015 | Burnham | ............... | C09J 9/02 |
| | | | | 174/257 |
| 2016/0100481 A1* | 4/2016 | Kim | ............... | B29C 39/003 |
| | | | | 174/251 |

* cited by examiner

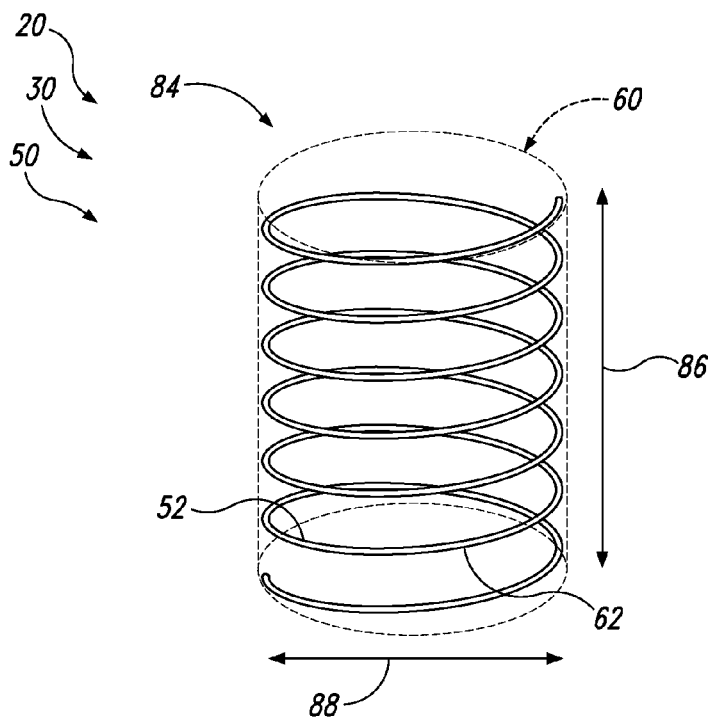
Fig. 7
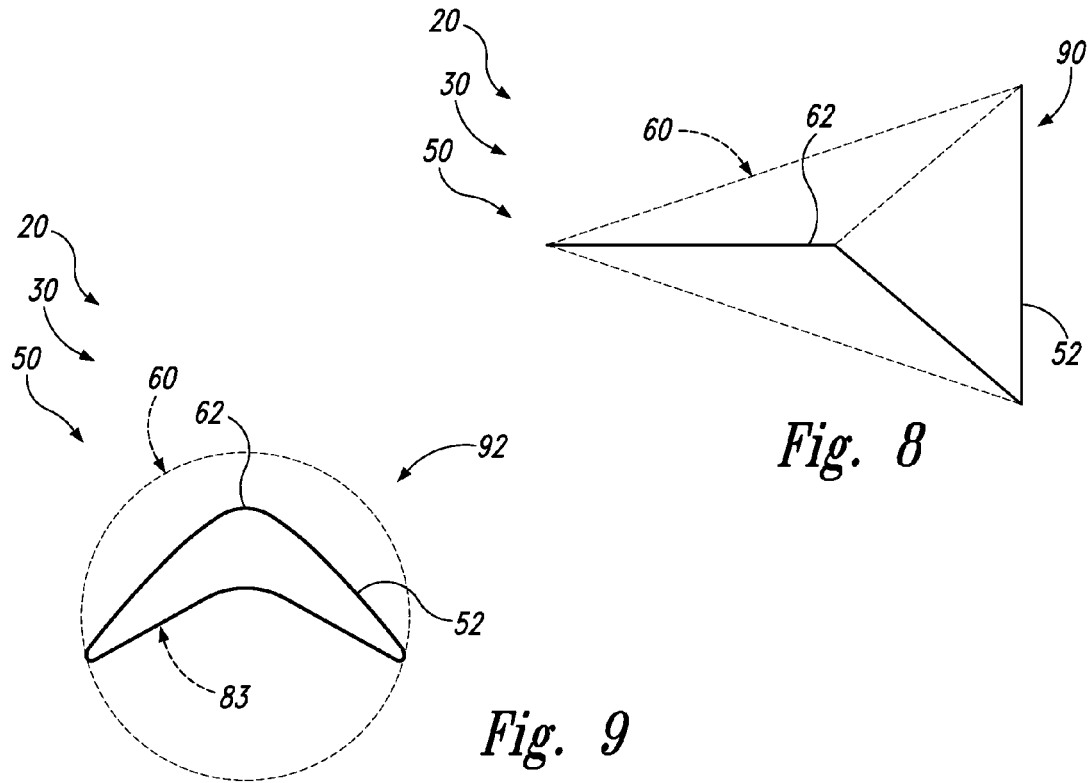
Fig. 8
Fig. 9

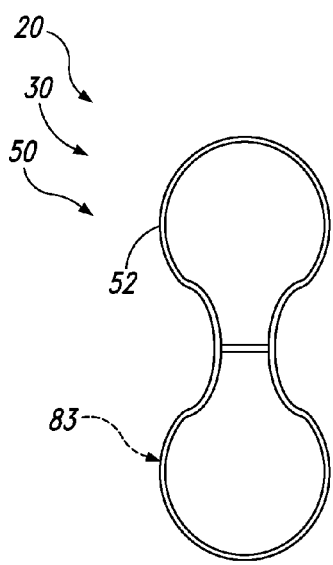
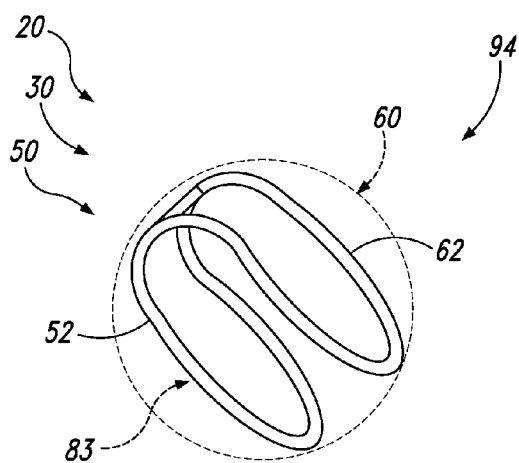
Fig. 10
Fig. 11
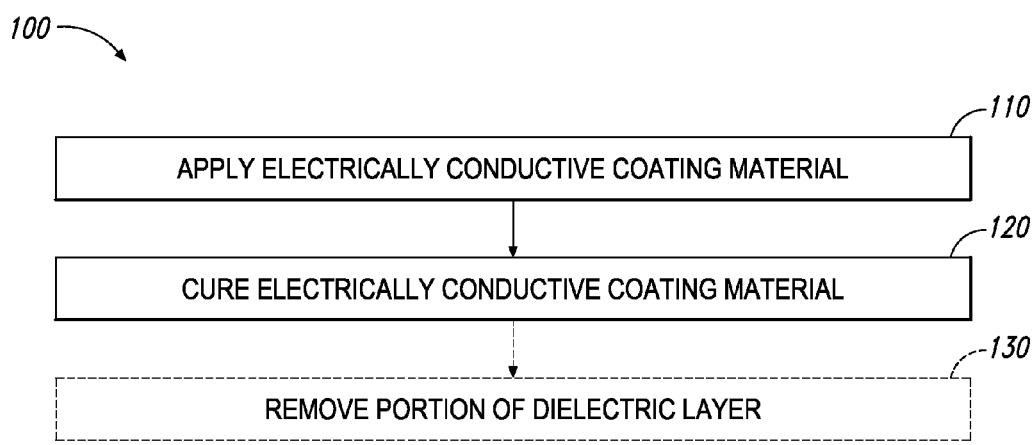
Fig. 12

ELECTRICALLY CONDUCTIVE COATING MATERIALS, ELECTRICALLY CONDUCTIVE COATING SYSTEMS, AND METHODS INCLUDING THE SAME

FIELD

The present disclosure relates to electrically conductive coating materials, electrically conductive coating systems, and methods including the same.

BACKGROUND

Aerospace vehicles, such as aircraft and/or spacecraft, often may be coated, covered, and/or painted with a dielectric layer, or coating. The dielectric layer may protect an underlying material of the aerospace vehicle and/or may provide a desired coloration, appearance, and/or aesthetic for the aerospace vehicle.

Aerospace vehicles often travel at relatively high speeds, which may cause a static charge to build up on an exposed surface of the dielectric layer. This static charge may be detrimental to the dielectric layer. Thus, there exists a need for improved electrically conductive coating materials, for electrically conductive coating systems, and/or for methods that include and/or utilize the electrically conductive coating materials and/or the electrically conductive coating systems.

SUMMARY

Electrically conductive coating materials, electrically conductive coating systems, and methods including the same are disclosed herein. The electrically conductive coating systems include an electrically conductive base layer and a dielectric layer that extend across the electrically conductive base layer and has an average thickness. The systems further include a plurality of electrically conductive elements that is embedded within the dielectric layer. Each of the plurality of electrically conductive elements is defined by an elongate body that has a nonlinear conformation and is in electrical contact with the electrically conductive base layer. In addition, each of the plurality of electrically conductive elements is shaped such that, regardless of an orientation of a given electrically conductive element within the dielectric layer, the given electrically conductive element projects from the electrically conductive base layer at least 80% of the average thickness of the dielectric layer.

The electrically conductive coating materials include a liquid dielectric that is configured to be applied to an electrically conductive base layer to define a dielectric layer that extends across the electrically conductive base layer and has an average thickness. The electrically conductive coating materials also include a plurality of electrically conductive elements that is suspended within the liquid dielectric. Each of the plurality of electrically conductive elements is defined by an elongate body that has a nonlinear conformation. In addition, each of the plurality of electrically conductive elements is shaped such that, regardless of an orientation of a given electrically conductive element within the dielectric layer, the given electrically conductive element extends across at least 80% of the average thickness of the dielectric layer.

The methods include applying an electrically conductive coating material to an electrically conductive base layer and curing the electrically conductive coating material to define the electrically conductive coating system. The electrically conductive coating material includes a liquid dielectric and, subsequent to the curing, the liquid dielectric defines a dielectric layer that extends across the electrically conductive base layer and has an average thickness. A plurality of electrically conductive elements is suspended within the liquid dielectric during the applying and embedded within the dielectric layer subsequent to the curing. Each of the plurality of electrically conductive elements is shaped such that, regardless of an orientation of a given electrically conductive element within the dielectric layer, the given electrically conductive element extends across at least 80% of the average thickness of the dielectric layer.

BRIEF DESCRIPTION OF THE DRAWINGS

FIG. 7 illustrates an effective volume and an actual volume of the electrically conductive element of FIGS. 4-6.

FIG. 8 illustrates another electrically conductive element according to the present disclosure.

FIG. 9 illustrates another electrically conductive element according to the present disclosure.

FIG. 10 is a top view illustrating another electrically conducive element according to the present disclosure.

FIG. 11 is a side view of the electrically conductive element of FIG. 10.

FIG. 12 is flowchart depicting methods of forming an electrically conductive coating system according to the present disclosure.

DESCRIPTION

Figure 1:
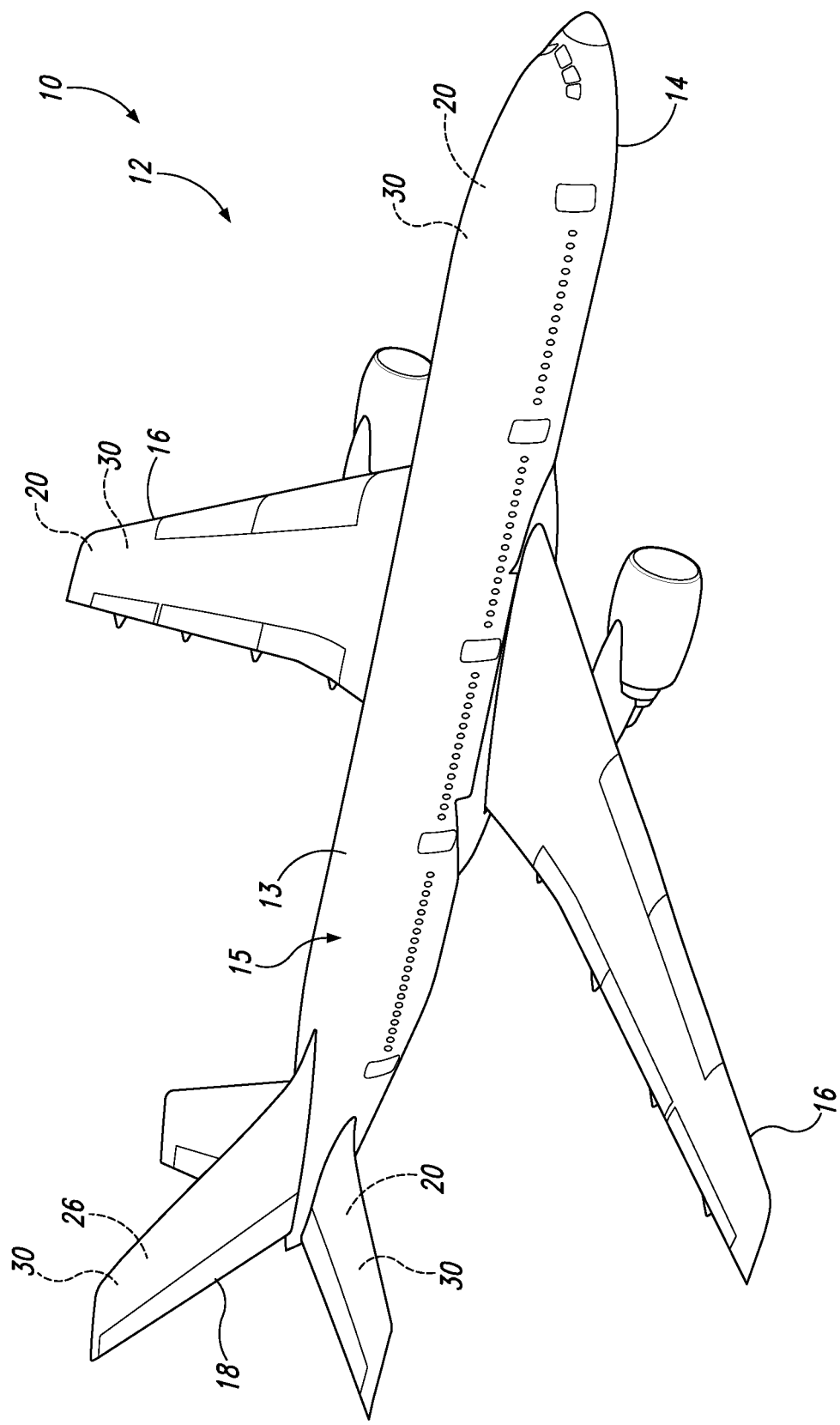
FIG. 1 is a profile view of an aerospace vehicle, in the form of an aircraft, that may include and/or utilize electrically conductive coating materials and/or electrically conductive coating systems according to the present disclosure.

FIGS. 1-12 provide examples of electrically conductive coating materials 20 and/or of electrically conductive coating systems 30, according to the present disclosure, of aerospace vehicles 10 that may include and/or utilize electrically conductive coating materials 20 and/or electrically conductive coating systems 30, and/or of methods 100 of utilizing electrically conductive coating materials 20 and/or of forming electrically conductive coating systems 30. Elements that serve a similar, or at least substantially similar, purpose are labeled with like numbers in each of FIGS. 1-12, and these elements may not be discussed in detail herein with reference to each of FIGS. 1-12. Similarly, all elements may not be labeled in each of FIGS. 1-12, but reference numerals associated therewith may be utilized herein for consistency. Elements, components, and/or features that are discussed herein with reference to one or more of FIGS. 1-12 may be included in and/or utilized with any of FIGS. 1-12 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

FIG. 1 is a profile view of an aerospace vehicle 10, in the form of an aircraft 12, that may include and/or utilize electrically conductive coating materials 20 and/or the electrically conductive coating systems 30 according to the present disclosure. Aircraft 12 includes a plurality of components, such as a fuselage 14, wings 16, and/or an empennage 18. These components may be covered by a skin 15 and together may form and/or define an external surface 13 of aircraft 12. At least a portion of skin 15 and/or of external surface 13 may be covered, coated, and/or defined by electrically conductive coating system 30. As examples, at least a portion of skin 15 and/or of external surface 13 of fuselage 14, wings 16, and/or empennage 18 may be covered and/or defined by electrically conductive coating system 30.

As discussed herein, aerospace vehicle 10 may be configured for flight at relatively high speeds, and this high-speed flight may cause a static charge to be generated and/or to build up on external surface 13. If permitted to build up above certain levels, potentials, and/or voltages, this static charge may be detrimental to the performance of aerospace vehicle 10. However, electrically conductive coating systems 30, according to the present disclosure, may be configured to distribute, dissipate, shunt, and/or ground the static charge.

Figure 2:
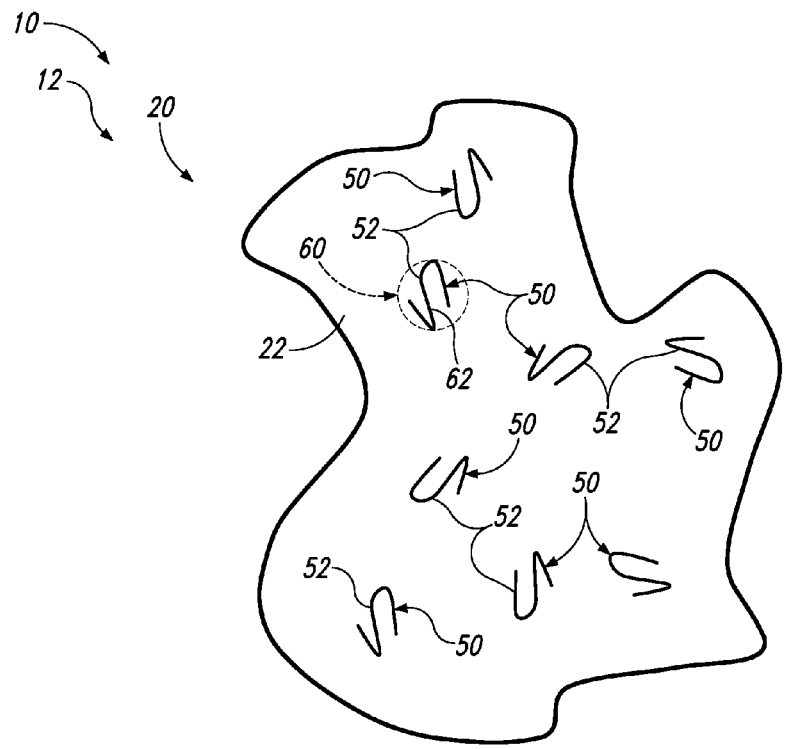
FIG. 2 is a schematic representation of an electrically conductive coating material according to the present disclosure.

FIG. 2 is a schematic representation of an electrically conductive coating material 20 according to the present disclosure. Electrically conductive coating material 20 also may be referred to herein as a coating material 20, a paint 20, a coating 20, and/or a material 20. Material 20 may be configured to coat, cover, and/or protect an electrically conductive base layer 32, as illustrated in FIGS. 3-6. As illustrated in FIG. 2, material 20 includes a liquid dielectric 22 and a plurality of electrically conductive elements 50. Electrically conductive elements 50 are suspended within liquid dielectric 22 and are discussed in more detail herein.

Electrically conductive coating material 20, including liquid dielectric 22 and/or electrically conductive elements 50 thereof, may be applied to electrically conductive base layer 32 in any suitable manner. As examples, material 20 may be applied via spraying, brushing, and/or flowing. As an additional example, material 20 may be cast as a film separately from electrically conductive base layer 32 and subsequently brought into contact with and/or adhered to electrically conductive base layer 32. Application of electrically conductive coating material 20 to electrically conductive base layer 32 is discussed in more detail herein with reference to methods 100 of FIG. 12.

Liquid dielectric 22 may be configured to be applied to electrically conductive base layer 32 to form, create, and/or define a dielectric layer 36 that extends across electrically conductive base layer 32 and that has and/or defines an average thickness 38, as also illustrated in FIGS. 3-6. As examples, liquid dielectric 22 may be configured to cure, dry, polymerize, gel, and/or solidify on electrically conductive base layer 32 to define dielectric layer 36. Examples of liquid dielectric 22 include any suitable liquid dielectric material, liquid polymeric material, uncured paint, and/or uncured epoxy. Liquid dielectric 22 also may be referred to herein as a precursor resin 22.

Figure 3:
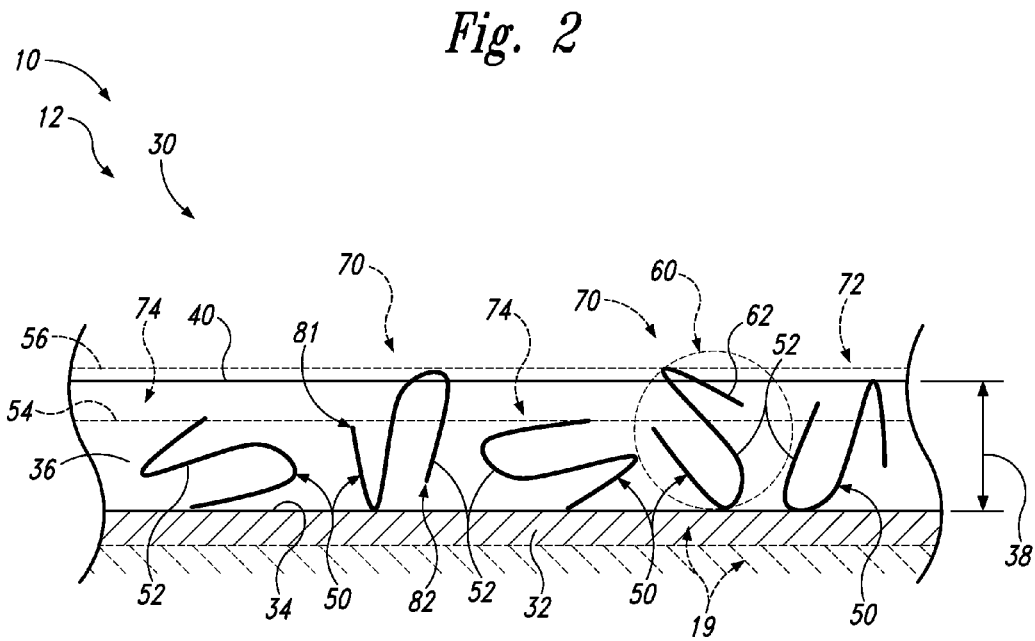
FIG. 3 is a schematic representation of an electrically conductive coating system according to the present disclosure.

FIG. 3 is a schematic representation of an electrically conductive coating system 30 according to the present disclosure. Electrically conductive coating system 30 also may be referred to herein as a coating system 30 and/or as a system 30. System 30 includes an electrically conductive base layer 32 and a dielectric layer 36 that extends across, coats, at least partially encapsulates, and/or covers electrically conductive base layer 32 and/or at least a portion of at least one surface 34 thereof. In addition, dielectric layer 36 has and/or defines an average thickness 38. System 30 further includes a plurality of electrically conductive elements 50. Electrically conductive elements 50 also may be referred to herein as conductive elements 50 and/or as elements 50. Elements 50 are embedded within dielectric layer 36, are in electrical contact with electrically conductive base layer 32, and are discussed in more detail herein. As discussed in more detail herein, electrically conductive coating system 30 may be formed and/or defined by applying electrically conductive coating material 20 of FIG. 2 to electrically conductive base layer 32.

Dielectric layer 36 may include and/or be any suitable dielectric, or electrically insulating, layer, coating, and/or cover that may extend across electrically conductive base layer 32 and/or that may define average thickness 38. Dielectric layer 36 may have and/or define an exposed surface 40, and average thickness 38 may be defined between exposed surface 40 and electrically conducive base layer 32, or a surface 34 thereof. As an example, average thickness 38 may be defined as a volume of dielectric layer 36 divided by an area of exposed surface 40. Average thickness 38 also may be referred to herein as a mean thickness 38 of dielectric layer 36.

Average thickness 38 may have any suitable value. As examples, average thickness 38 may be at least 5 micrometers, at least 10 micrometers, at least 15 micrometers, at least 20 micrometers, at least 30 micrometers, at least 40 micrometers, at least 50 micrometers, at least 75 micrometers, at least 100 micrometers, at least 150 micrometers, at least 200 micrometers, at least 250 micrometers, at least 500 micrometers, at least 1000 micrometers, at least 1500 micrometers, and/or at least 2000 micrometers. Additionally or alternatively, average thickness 38 also may be less than 3000 micrometers, less than 2500 micrometers, less than 2000 micrometers, less than 1500 micrometers, less than 1000 micrometers, less than 750 micrometers, less than 500 micrometers, less than 250 micrometers, less than 200 micrometers, less than 150 micrometers, less than 100 micrometers, and/or less than 50 micrometers.

As discussed, dielectric layer 36 may include and/or be an electrically insulating layer. As such, dielectric layer 36 may have and/or define less than a threshold electrical conductivity. Examples of the threshold electrical conductivity include electrical conductivities of less than $10^{-5}$ Siemens/meter (S/m), less than $10^{-6}$ S/m, less than $10^{-7}$ S/m, less than $10^{-8}$ S/m, less than $10^{-9}$ S/m, less than $10^{-10}$ S/m, less than $10^{-11}$ S/m, less than $10^{-12}$ S/m, less than $10^{-13}$ S/m, less than $10^{-14}$ S/m, less than $10^{-15}$ S/m, less than $10^{-16}$ S/m, less than $10^{-17}$ S/m, less than $10^{-18}$ S/m, less than $10^{-19}$ S/m, and/or less than $10^{-20}$ S/m.

Dielectric layer 36 may be formed from and/or may include any suitable material and/or materials. As examples, dielectric layer 36 may include and/or be a cured, gelled, and/or solidified dielectric material, polymeric material, paint, and/or epoxy.

Electrically conductive base layer 32 may include and/or be any suitable structure that may support dielectric layer 36 and/or that may directly and/or indirectly electrically contact elements 50. As an example, electrically conductive base layer 32 may form a portion of a substructure 19. As another example, electrically conductive base layer 32 may cover and/or coat substructure 19. Under these conditions, electrically conductive base layer 32 also may be referred to herein as an electrically conductive coating 32, an electrically conductive layer 32, and/or an electrically conductive film 32.

An example of substructure 19 includes a skin of an aircraft. When substructure 19 includes the skin of the aircraft, the skin of the aircraft may include and/or be a metallic skin, an aluminum skin, and/or a composite skin. Examples of materials that may be included in and/or comprise electrically conductive base layer 32 include any suitable conductive material, electrically conductive material, metal, gold, silver, platinum, aluminum, tungsten, carbon fiber, and/or conductive polymer.

It is within the scope of the present disclosure that electrically conductive base layer 32 may be maintained at, or near, a predetermined and/or specified electrical potential. As an example, electrically conductive base layer 32 may be grounded, such as to a body of an aerospace vehicle 10 that includes and/or utilizes system 30.

As discussed, electrically conductive base layer 32 may be formed from an electrically conductive material. As such, electrically conductive base layer 32 may have and/or define at least a threshold electrical conductivity. Examples of the threshold electrical conductivity include threshold electrical conductivities of at least 10 S/m, at least $10^2$ S/m, at least $10^3$ S/m, at least $10^4$ S/m, at least $10^5$ S/m, at least $10^6$ S/m, at least $10^7$ S/m, at least $10^8$ S/m, at least $10^9$ S/m, and/or at least $10^{10}$ S/m.

As discussed, elements 50 are in electrical contact with electrically conductive base layer 32. As an example, elements 50 may be in direct electrical contact, and/or may be in direct physical contact with electrically conductive base layer 32. As another example, elements 50 may touch electrically conductive base layer 32. As yet another example, elements 50 may be in indirect electrical contact with electrically conductive base layer 32, such as when a thin film of the dielectric material that comprises dielectric layer 36 extends between elements 50 and electrically conductive base layer 32. Under these conditions, a thickness of the film may be such that at least a threshold electrical conductivity exists between a given element 50 and electrically conductive base layer 32.

Elements 50 are shaped such that, regardless of an orientation of a given element 50, the given element 50 projects and/or extends from electrically conductive base layer 32 to within a threshold fraction of average thickness 38 of dielectric layer 36. Additionally or alternatively, the given element 50 also may be shaped such that the given element 50 extends across at least the threshold fraction of average thickness 38. This is illustrated in dashed lines in FIG. 3, with each element 50 in system 20 extending from electrically conductive base layer 32 at least a threshold minimum fraction 54 of average thickness 38 and less than a threshold maximum fraction 56 of average thickness 38. In the systems and methods according to the present disclosure, each element 50 within system 20 may have and/or define a maximum height above electrically conductive base layer 32 that is within the threshold fraction of average thickness 38, that is greater than threshold minimum fraction 54, and/or that is less than threshold maximum fraction 56.

Examples of the threshold fraction of average thickness 38 include a substantial fraction of average thickness 38 and/or a majority of average thickness 38. More specific examples of the threshold fraction of average thickness 38, or of threshold minimum fraction 56, include threshold fractions of at least 50%, at least 60%, at least 70%, at least 80%, at least 90%, at least 100%, and/or at least 110% of the average thickness of the dielectric layer. Additionally more specific examples of the threshold fraction of average thickness 38, or of threshold maximum fraction 58, include fractions of less than 200%, less than 175%, less than 150%, less than 140%, less than 130%, less than 120%, less than 110%, less than 100%, less than 90%, and/or less than 80% of the average thickness of the dielectric layer.

It is within the scope of the present disclosure that elements 50 may extend from electrically conductive base layer 32 to exposed surface 40 of dielectric layer 36 and/or may physically contact exposed surface 40. As an example, and as indicated in FIG. 3 at 70, one or more element 50 may project from and/or penetrate through exposed surface 40 of dielectric layer 36. Under these conditions, elements 50 may extend from surface 34 of electrically conductive base layer 32 a distance that is greater than average thickness 38. Stated another way, at least a portion of one or more elements 50 may extend beyond dielectric layer 36, may be exposed to atmosphere, and/or may be exposed to an ambient environment that surrounds system 30.

Additionally or alternatively, and as indicated in FIG. 3 at 72, one or more elements 50 may end at exposed surface 40, may terminate within exposed surface 40, and/or may form a portion of exposed surface 40. Under these conditions, elements 50 may extend from surface 34 of electrically conductive base layer 32 a distance that is equal, or at least substantially equal, to average thickness 38.

It is also within the scope of the present disclosure that elements 50 may not contact, penetrate, and/or extend through exposed surface 40 of dielectric layer 36, at least immediately subsequent to formation of system 30. This is illustrated in FIG. 3 at 74. Under these conditions, elements 50 may extend from surface 34 of electrically conductive base layer 32 a distance that is less than average thickness 38.

Electrically conductive elements 50 disclosed herein, such as those of FIGS. 2-3, are formed and/or defined by an elongate body 52 that has a nonlinear conformation. The nonlinear conformation is selected (i.e., the electrically conductive element is shaped) such that each electrically conductive element projects from electrically conductive base layer 32 to within the threshold fraction of average thickness 38, as discussed. This is illustrated generally in FIG. 3 by the plurality of electrically conductive elements 50 having at least substantially the same conformation but different orientations on electrically conductive base layer 32 and all extending from surface 34 of electrically conductive base layer 32 to between threshold minimum fraction 54 and threshold maximum fraction 56. This is also illustrated more specifically in FIGS. 4-6, which are discussed in more detail herein.

The nonlinear conformation may include any suitable shape and/or conformation, and different electrically conductive elements 50 may have and/or define different nonlinear conformations. As an example, the nonlinear conformation may include at least one arcuate region. As another example, the nonlinear conformation may include at least one linear region. As additional examples, the nonlinear conformation may include one or more of a pyramidal shape, a conic shape, a coil, a helix, a spiral, a bent circular ring, a lobed structure, at least one loop, and/or at least one enclosed region. More specific examples of the nonlinear conformation are illustrated in FIGS. 4-11 and discussed in more detail herein.

As used herein, the phrase "nonlinear conformation" may include any conformation that is not arranged, entirely, in a straight line. As such, electrically conductive bodies 50 may include one or more linear segments, or regions; however, these linear segments, when present, generally are not collinear and/or are connected by nonlinear segments, or regions.

Elongate body 52 may have and/or define at least a threshold aspect ratio. The threshold aspect ratio may be defined as a characteristic cross-sectional dimension, or transverse cross-sectional dimension, of elongate body 52 divided by a length, or an extended length, of elongate body 52. Examples of the threshold aspect ratio include threshold aspect ratios of at least 10, at least 25, at least 50, at least 100, at least 250, at least 500, at least 1000, at least 2500, at least 5000, or at least 10000.

When elongate body 52 has a circular, or at least substantially circular, transverse cross-sectional shape, the characteristic cross-sectional dimension may be a diameter, or transverse diameter, thereof. When elongate body 52 has a non-circular transverse cross-sectional shape, the characteristic cross-sectional dimension may be an effective cross-sectional diameter, or effective transverse cross-sectional diameter, thereof. The effective cross-sectional diameter may be defined as a diameter of a circle that has the same area as a transverse cross-sectional area of elongate body 52.

The extended length of elongate body 52 may be defined as the length of elongate body 52 were elongate body 52 deformed into a straight line. As an example, and as illustrated in FIG. 3, elongate body 52 may include a first end 81 and a spaced-apart second end 82. When elongate body 52 includes first end 81 and second end 82, the length of elongate body 52 may be defined as a total length from first end 81 to second end 82 as measured along elongate body 52.

As another example, and as illustrated in FIGS. 9-11 and discussed in more detail herein, elongate body 50 may define a continuous loop, a closed loop, and/or a ring. When elongate body defines the continuous loop and/or ring, the length of elongate body 52 may be defined as a total distance from a given point 83 back to given point 83, as measured along elongate body 52.

It is within the scope of the present disclosure that the length, or extended length, of elongate body 52 may have any suitable value. As examples, the length of elongate body 52 may be greater than average thickness 38 of dielectric layer 36 and/or may be at least 5, at least 10, at least 20, at least 30, at least 40, at least 50, at least 75, and/or at least 100 times larger than average thickness 38. It is also within the scope of the present disclosure that the transverse cross-sectional diameter, or effective transverse cross-sectional diameter, of elongate body 52 may have any suitable value. As examples, the transverse cross-sectional diameter of elongate body 52 may be less than 50%, less than 40%, less than 30%, less than 20%, less than 10%, less than 5%, and/or less than 1% of average thickness 38 of dielectric layer 36. More specific examples of the transverse cross-sectional diameter include transverse cross-sectional diameters of less than 250 micrometers, less than 200 micrometers, less than 150 micrometers, less than 100 micrometers, less than 50 micrometers, less than 25 micrometers, less than 10 micrometers, and/or less than 5 micrometers.

Elongate body 52 may be constructed and/or defined in any suitable manner. As an example, elongate body 52 may include and/or be a conductive wire that may be bent and/or otherwise formed to define the nonlinear conformation. As another example, elongate body 52 may include and/or be a conductive foil that may be cut, die-cut, laser cut, and/or bent to define the nonlinear conformation.

It is within the scope of the present disclosure that elongate body 52 may have and/or define a constant, or at least substantially constant, transverse cross-sectional shape and/or transverse cross-sectional area across at least a threshold fraction of the length thereof. Examples of the threshold fraction of the length include threshold fractions of at least 10%, at least 20%, at least 30%, at least 40%, at least 50%, at least 60%, at least 70%, at least 80%, at least 90%, at least 95%, and/or at least 99% of the length.

Elongate body 52 also may include any suitable material and/or materials. As examples, elongate body 52 may include, or be formed from, a conductive material, an electrically conductive material, a metal, gold, silver, platinum, aluminum, tungsten, a carbon fiber, and/or a conductive polymer. Elongate body 52 also may be referred to herein as an elongate conductive body 52.

As discussed, electrically conductive element 50 and/or elongate body 52 thereof may be formed from an electrically conductive material. As such, electrically conductive element 50 and/or elongate body 52 may have and/or define at least a threshold electrical conductivity. Examples of the threshold electrical conductivity include threshold electrical conductivities of at least 10 S/m, at least $10^2$ S/m, at least $10^3$ S/m, at least $10^4$ S/m, at least $10^5$ S/m, at least $10^6$ S/m, at least $10^7$ S/m, at least $10^8$ S/m, at least $10^9$ S/m, and/or at least $10^{10}$ S/m.

With reference to FIG. 3, electrically conductive elements 50 may have and/or define any suitable relative orientation, placement, spacing, and/or average spacing within electrically conductive coating system 30 and/or within dielectric layer 36 thereof. As an example, electrically conductive elements 50 may be spaced-apart within dielectric layer 36. As another example, electrically conductive elements 50 may have and/or define an areal density of at least 0.01 per square centimeter ($cm^2$), at least 0.05 per $cm^2$, at least 0.1 per $cm^2$, at least 0.15 per $cm^2$, at least 0.2 per $cm^2$, at least 0.3 per $cm^2$, at least 0.4 per $cm^2$, at least 0.5 per $cm^2$, at least 0.6 per $cm^2$, at least 0.7 per $cm^2$, at least 0.8 per $cm^2$, at least 0.9 per $cm^2$, and/or at least 1 per $cm^2$. Additionally or alternatively, the areal density may be less than 5 per $cm^2$, less than 4 per $cm^2$, less than 3 per $cm^2$, less than 2 per $cm^2$, less than 1 per $cm^2$, less than 0.8 per $cm^2$, less than 0.6 per $cm^2$, less than 0.4 per $cm^2$, and/or less than 0.2 per $cm^2$. FIG. 3 may not be drawn to scale.

As discussed, electrically conductive elements 50 of electrically conductive coating materials 20 and/or of electrically conductive coating systems 30, according to the present disclosure, may be defined by an elongate body 52 that has a nonlinear conformation. Such a configuration may permit electrically conductive elements 50 to extend between electrically conductive base layer 32 to exposed surface 40, to dissipate static charge, and/or to conduct static charge away from exposed surface 40 of dielectric layer 36 and into electrically conductive base layer 32. In addition, the conformation of electrically conductive elements 50 may permit such static charge dissipation without the added weight and/or aesthetic impact that may be caused by utilizing large, substantially spherical, conductive particles to dissipate the static charge. As an example, a mass, or weight, of electrically conductive elements 50 may be substantially less than a mass, or weight, of a spherical conductive particle that might be utilized to dissipate the static charge. As another example, electrically conductive elements 50 may be much more difficult to visually detect and/or observe when compared to the spherical conductive particles.

With the above discussion in mind, electrically conductive elements 50 may be described herein as defining an effective volume 60 and an actual volume 62, with the actual volume being less than, or less than a threshold fraction of, the effective volume. Examples of the threshold fraction of the effective volume include threshold fractions of less than 50%, less than 40%, less than 30%, less than 25%, less than 20%, less than 15%, less than 10%, less than 5%, and/or less than 1%. This is in contrast to the above-described spherical conductive particles, where the effective volume and the actual volume may be substantially the same.

As used herein, the term "effective volume 60" may be a smallest volume of a standard three-dimensional geometric shape that completely surrounds a given electrically conductive element 50. Examples of the standard three-dimensional geometric shape include a sphere, a cylinder, a cube, a rectangular solid, a cone, a conic section, a triangular solid, and/or a pyramidal shape.

As used herein, the term "actual volume 62" may refer to a volume of elongate body 52. As an example, and when elongate body 52 defines a constant, or at least substantially constant, transverse cross-sectional area, the actual volume of elongate body 52 may be the transverse cross-sectional area multiplied by the length of elongate body 52. As another example, the actual volume of elongate body 52 may be equal to a volume of fluid that is displaced by elongate body 52 when elongate body 52 is submerged within the fluid.

Figure 4:
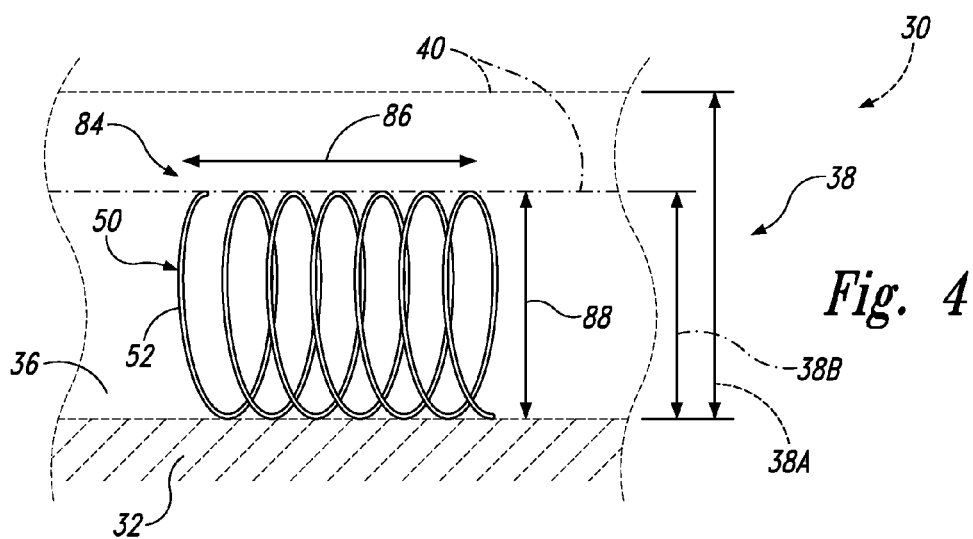
FIG. 4 is a side view of an electrically conductive element, according to the present disclosure, in a first orientation.
Figure 5:
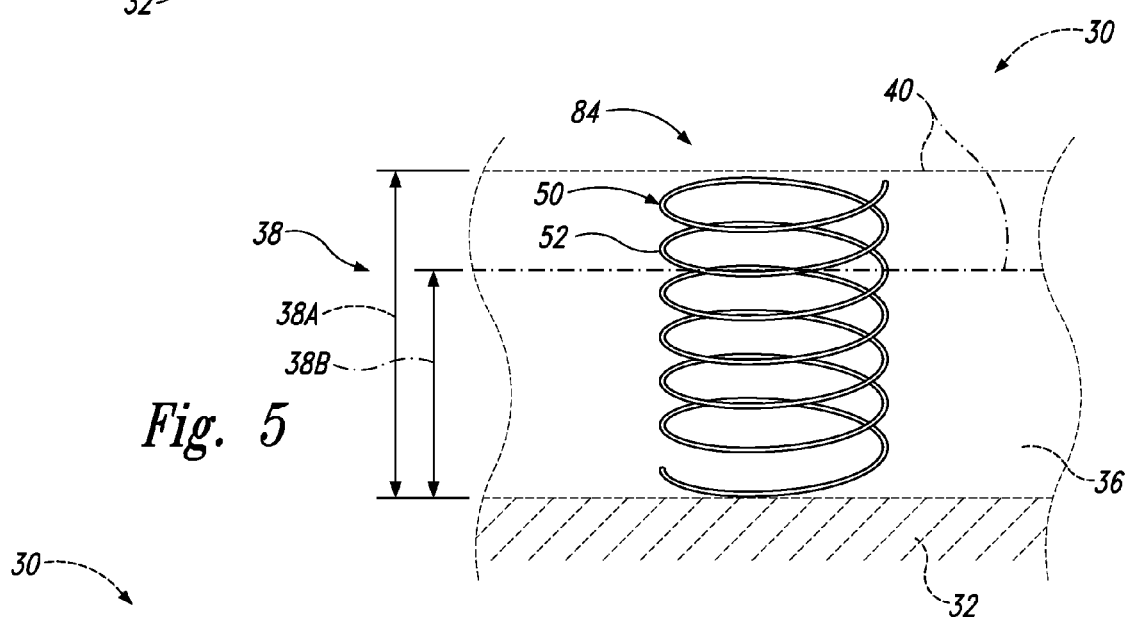
FIG. 5 is a side view of the electrically conductive element of FIG. 4 in a second orientation.
Figure 6:
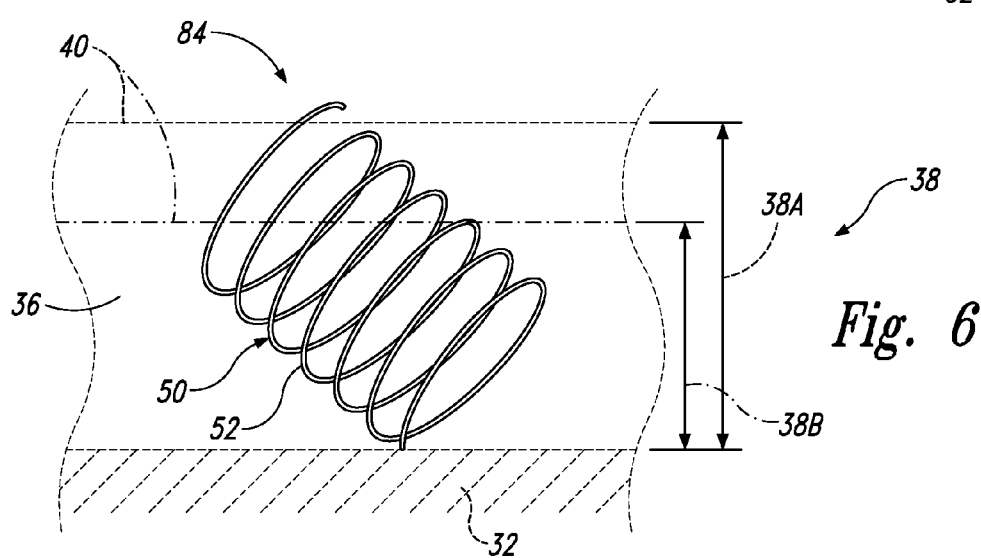
FIG. 6 is a side view of the electrically conductive element of FIGS. 4-5 in a third orientation.

As discussed, elements 50 are shaped such that, regardless of the orientation of a given element 50 within a given dielectric layer 36, the given element 50 projects from electrically conductive base layer 32 to within a threshold fraction of an average thickness 38 of dielectric layer 36 and/or extends across the threshold fraction of average thickness 38. With this in mind, FIG. 4 is a side view of an electrically conductive element 50, according to the present disclosure, in a first orientation, while FIG. 5 is a side view of the electrically conductive element of FIG. 4 in a second orientation, and FIG. 6 is a side view of the electrically conductive element of FIGS. 4-5 in a third orientation. The electrically conductive element of FIGS. 4-6 has a helical conformation 84 that defines a helix height 86 and a helix diameter 88, as illustrated in FIG. 4. In the illustrated example, helix height 86 is greater than helix diameter 88; however, this is not required.

As illustrated in FIGS. 4-6, electrically conductive element 50 may be embedded within a dielectric layer 36 that has an average thickness 38. Dielectric layer 36 may extend across an electrically conductive base layer 32. FIGS. 4-6 illustrate two different average thicknesses 38, a relatively thicker average thickness 38A, which is indicated in dashed lines, and a relatively thinner average thickness 38B, which is indicated in dash-dot lines.

FIGS. 4-6 illustrate that, regardless of the orientation of electrically conductive element 50 within dielectric layer 36 and/or relative to electrically conductive base layer 32, electrically conductive element 50 is shaped to project from electrically conductive base layer at least a threshold fraction of average thickness 38. In the example of the relatively thinner average thickness 38, which is illustrated in dash-dot lines, helix diameter 88 is greater than or equal to average thickness 38 and electrically conductive element 50 extends at least to an exposed surface 40 of dielectric layer 36 for all orientations of electrically conductive element 50 within dielectric layer 36 and/or relative to electrically conductive base layer 32.

In the example of the relatively thicker average thickness 38, which is illustrated in dashed lines, there are certain orientations of electrically conductive element 50 within dielectric layer 36 and/or relative to electrically conductive base layer 32 in which electrically conductive element 50 does not extend to exposed surface 40, as illustrated in FIG. 4, and other orientations in which electrically conductive element 50 does extend to and/or through exposed surface 40, as illustrated in FIGS. 5-6. Regardless of the exact value for average thickness 38, the dimensions of electrically conductive element 50 may be selected such that electrically conductive element 50 always projects from electrically conductive base layer 32 to within the threshold fraction of average thickness 38 and/or always extends across the threshold fraction of average thickness 38, as discussed herein.

FIGS. 7-11 provide examples of more specific conformations for electrically conductive elements 50 that may form a portion of electrically conductive coating materials 20 and/or of electrically conductive coating systems 30 according to the present disclosure. Electrically conductive elements 50 of FIGS. 7-11 may include and/or be more specific examples of electrically conductive elements 50 of FIGS. 2-3, and any of the structures, functions, and/or features of electrically conductive elements 50 of FIGS. 7-11 may be included in and/or utilized with electrically conductive elements 50 of FIGS. 2-3 without departing from the scope of the present disclosure. Similarly, any of the structures, functions, and/or features of electrically conductive elements 50 of FIGS. 2-3 may be included in and/or utilized with electrically conductive elements 50 of FIGS. 7-11 without departing from the scope of the present disclosure.

FIG. 7 illustrates an electrically conductive element 50 that has a helical conformation 84. Helical conformation 84 of FIG. 7 may be at least substantially similar to helical conformation 84 of FIGS. 4-6 and may define a helix height 86 and a helix diameter 88. Helical conformation 84 also may be referred to herein as a coil conformation 84 and/or as a spring-shaped conformation 84.

FIG. 7 further illustrates, in dashed lines, that an effective volume 60 of electrically conductive elements 50 that exhibit helical conformation 84 may be approximated by a cylinder. The cylinder may have a diameter that is equal to helix diameter 88 and a height that is equal to helix height 86.

FIG. 8 illustrates an electrically conductive element 50 that has a pyramidal conformation 90. In the example of FIG. 8, electrically conductive element 50 may be formed from an elongate body 52 in the form of a wire that is bent at two locations, with a first bend being defined, at least substantially, in an X-Y plane and a second bend being defined, at least substantially, in a Y-Z plane. As an example, electrically conductive element 50 of FIG. 8 may be bent at a 90 degree angle in both the X-Y plane and in the Y-Z plane; however, this specific angle is not required.

FIG. 8 further illustrates, in dashed lines, that an effective volume 60 of electrically conductive elements 50 that exhibit pyramidal conformation 90 may be approximated by a pyramidal shape and/or by a triangular pyramid. Similar to helical conformation 84 of FIGS. 4-7, the dimensions of pyramidal conformation 90 may be selected such that electrically conductive element 50 always projects from electrically conductive base layer 32 to within the threshold fraction of average thickness 38 and/or always extends across the threshold fraction of average thickness 38, as discussed herein and illustrated in FIGS. 3-6.

FIG. 9 illustrates an electrically conductive element 50 that has a bent circular ring conformation 92. In the example of FIG. 9, electrically conductive element 50 may be formed from an elongate body 52 in the form of a wire and/or foil that defines a circular ring and that is bent as illustrated.

FIG. 9 further illustrates, in dashed lines, that an effective volume 60 of electrically conductive elements 50 that exhibit bent circular ring conformation 92 may be approximated by a spherical shape. Similar to helical conformation 84 of FIGS. 4-7, the dimensions of bent circular ring conformation 92 may be selected such that electrically conductive element 50 always projects from electrically conductive base layer 32 to within the threshold fraction of average thickness 38 and/or always extends across the threshold fraction of average thickness 38, as discussed herein and illustrated in FIGS. 3-6.

FIGS. 10-11 illustrate an electrically conductive element 50 in the form of a lobed structure 94. FIG. 10 is a top view of lobed structure 94, while FIG. 11 is a side view of lobed structure 94. Lobed structure 94 also may be referred to herein as being dumbbell-shaped, as being figure 8-shaped, and/or as including two linked nodes. Lobed structure 94 may be cut from a foil, such as via die-cutting and/or laser-cutting, and bent as illustrated in FIG. 11.

FIG. 11 further illustrates, in dashed lines, that an effective volume 60 of electrically conductive elements 50 that exhibit lobed structure 94 may be approximated by a spherical shape. Similar to helical conformation 84 of FIGS. 4-7, the dimensions of lobed structure 94 may be selected such that electrically conductive element 50 always projects from electrically conductive base layer 32 to within the threshold fraction of average thickness 38 and/or always extends across the threshold fraction of average thickness 38, as discussed herein and illustrated in FIGS. 3-6.

As illustrated in FIGS. 7-9 and 11, an actual volume 62 of electrically conductive element 50 may be substantially less than effective volume 60. Examples of the relationship between actual volume 62 and effective volume 60 are disclosed herein.

FIG. 12 is flowchart depicting methods 100 of forming an electrically conductive coating system according to the present disclosure. Methods 100 include applying an electrically conductive coating material at 110 and curing the electrically conductive coating material at 120. Methods 100 further may include removing a portion of a dielectric layer at 130.

Applying the electrically conductive coating material at 110 may include applying the electrically conductive coating material to an electrically conductive base layer. Examples of the electrically conductive coating material are disclosed herein with reference to electrically conductive coating material 20. The applying at 110 may be accomplished in any suitable manner. As examples, the applying at 110 may include spraying the electrically conductive coating material onto the electrically conductive base layer, brushing the electrically conductive coating material onto the electrically conductive base layer, flowing the electrically conductive coating material onto the electrically conductive base layer, and/or casting the electrically conductive coating material as a film and subsequently adhering the film to the electrically conductive base layer.

Curing the electrically conductive coating material at 120 may include curing to form and/or define an electrically conductive coating system and/or to cure a dielectric liquid of the electrically conductive coating material such that the dielectric liquid forms and/or defines the dielectric layer. Examples of the electrically conductive coating system are disclosed herein with reference to electrically conductive coating system 30. The curing at 120 may be accomplished in any suitable manner. As examples, the curing at 120 may include heating the electrically conductive coating material, polymerizing at least a portion of the electrically conductive coating material, and/or drying the electrically conductive coating material.

Removing the portion of the dielectric layer at 130 may include removing at least a portion of the dielectric layer to expose a plurality of electrically conductive elements and/or to flatten and/or planarize an exposed surface of the dielectric layer. This may include removing at least a portion of the exposed surface of the dielectric layer, decreasing an average thickness of the dielectric layer, and/or modifying the electrically conductive coating system such that the plurality of electrically conductive elements extends through the exposed surface and/or forms a portion of the exposed surface.

As a more specific example, and subsequent to the applying at 110, surface energy forces may cause a portion of a liquid dielectric within the electrically conductive coating material to wick up, wick around, and/or at least partially coat and/or cover a region of the plurality of electrically conductive elements that otherwise would extend through the exposed surface. Then, subsequent to the curing at 120, a corresponding portion of the dielectric layer also may at least partially coat and/or cover the region of the plurality of electrically conductive elements. Under these conditions, the removing at 130 may include removing the portion of the dielectric layer that previously had wicked up, wicked around, and/or at least partially coated and/or covered the region of the plurality of electrically conductive elements. As another more specific example, and subsequent to the applying at 110 and the curing at 120, the upper surface of the dielectric layer may be uneven, and the removing at 130 may include polishing, smoothing, and/or planarizing the dielectric layer.

It is within the scope of the present disclosure that the removing at 130 may be performed at any suitable time and/or with any suitable sequence during methods 100. As an example, the removing at 130 may be performed subsequent to the applying at 110 and/or subsequent to the curing at 120.

It is also within the scope of the present disclosure that the removing at 130 may be performed in any suitable manner. As examples, the removing at 130 may include polishing the electrically conductive coating system, sanding the electrically conductive coating system, and/or buffing the electrically conductive coating system.

Examples of inventive subject matter according to the present disclosure are described in the following enumerated paragraphs:

A1. An electrically conductive coating material for coating an electrically conductive base layer, the electrically conductive coating material comprising:

a liquid dielectric configured to be applied to the electrically conductive base layer to define a dielectric layer that extends across the electrically conductive base layer and has an average thickness; and a plurality of electrically conductive elements suspended within the liquid dielectric, wherein each of the plurality of electrically conductive elements:

(i) is defined by an elongate body that has a nonlinear conformation; and (ii) is shaped such that, regardless of an orientation of a given electrically conductive element of the plurality of electrically conductive elements within the dielectric layer, the given electrically conductive element extends across at least a threshold fraction of the average thickness of the dielectric layer.

A2. The electrically conductive coating material of paragraph A1, wherein the liquid dielectric is configured to cure on the electrically conductive base layer to define the dielectric layer.

A3. The electrically conductive coating material of any of paragraphs A1-A2, wherein the liquid dielectric is configured to solidify to define the dielectric layer.

A4. The electrically conductive coating material of any of paragraphs A1-A3, wherein the liquid dielectric includes at least one of a polymeric material, a paint, and an uncured epoxy.

B1. An electrically conductive coating system, comprising:
an electrically conductive base layer;
a dielectric layer that extends across the electrically conductive base layer and has an average thickness; and
a plurality of electrically conductive elements embedded within the dielectric layer, wherein each of the plurality of electrically conductive elements:
(i) is defined by an elongate body that has a nonlinear conformation;
(ii) is in electrical contact with the electrically conductive base layer; and
(iii) is shaped such that, regardless of an orientation of a given electrically conductive element of the plurality of electrically conductive elements within the dielectric layer, the given electrically conductive element at least one of (a) projects from the electrically conductive base layer to within a threshold fraction of the average thickness of the dielectric layer and (b) extends across at least the threshold fraction of the average thickness of the dielectric layer.

B2. The electrically conductive coating system of paragraph B1, wherein each of the plurality of electrically conductive elements is in direct electrical contact with the electrically conductive base layer.

B3. The electrically conductive coating system of any of paragraphs B1-B2, wherein each of the plurality of electrically conductive elements is in direct physical contact with the electrically conductive base layer.

B4. The electrically conductive coating system of any of paragraphs B1-B3, wherein each of the plurality of electrically conductive elements touches the electrically conductive base layer.

B5. The electrically conductive coating system of any of paragraphs B1-B4, wherein each of the plurality of electrically conductive elements has a maximum height above the electrically conductive base layer that is within the threshold fraction of the average thickness of the dielectric layer.

B6. The electrically conductive coating system of any of paragraphs B1-B5, wherein each of the plurality of electrically conductive elements extends from the electrically conductive base layer at least the threshold fraction of the average thickness of the dielectric layer.

C1. The electrically conductive coating material of any of paragraphs A1-A4 or the electrically conductive coating system of any of paragraphs B1-B6, wherein the elongate body has an aspect ratio of at least 10, at least 25, at least 50, at least 100, at least 250, at least 500, at least 1000, at least 2500, at least 5000, or at least 10000.

C2. The electrically conductive coating material of any of paragraphs A1-A4 or C1 or the electrically conductive coating system of any of paragraphs B1-C1, wherein the elongate body has a length that is at least 5, at least 10, at least 20, at least 30, at least 40, at least 50, at least 75, or at least 100 times the average thickness of the dielectric layer.

C3. The electrically conductive coating material of any of paragraphs A1-A4 or C1-C2 or the electrically conductive coating system of any of paragraphs B1-C2, wherein the elongate body has an effective transverse cross-sectional diameter that is at least one of less than 50%, less than 40%, less than 30%, less than 20%, less than 10%, less than 5%, or less than 1% of the average thickness of the dielectric layer.

C4. The electrically conductive coating material of any of paragraphs A1-A4 or C1-C3 or the electrically conductive coating system of any of paragraphs B1-C3, wherein the elongate body has an/the effective transverse cross-sectional diameter that is at least one of less than 250 micrometers, less than 200 micrometers, less than 150 micrometers, less than 100 micrometers, less than 50 micrometers, less than 25 micrometers, less than 10 micrometers, or less than 5 micrometers.

C5. The electrically conductive coating material of any of paragraphs A1-A4 or C1-C4 or the electrically conductive coating system of any of paragraphs B1-C4, wherein the elongate body extends between a first end and a spaced-apart second end.

C6. The electrically conductive coating material of any of paragraphs A1-A4 or C1-O5 or the electrically conductive coating system of any of paragraphs B1-O5, wherein the elongate body defines at least one closed loop.

C7. The electrically conductive coating material of any of paragraphs A1-A4 or C1-C6 or the electrically conductive coating system of any of paragraphs B1-C6, wherein the elongate body is a conductive wire.

C8. The electrically conductive coating material of any of paragraphs A1-A4 or C1-C7 or the electrically conductive coating system of any of paragraphs B1-C7, wherein the elongate body is a conductive foil.

C9. The electrically conductive coating material of any of paragraphs A1-A4 or C1-C8 or the electrically conductive coating system of any of paragraphs B1-C8, wherein the elongate body has a length, and further wherein the elongate body has an at least substantially constant transverse cross-sectional shape across at least a threshold fraction of the length.

C10. The electrically conductive coating material of any of paragraphs A1-A4 or C1-C9 or the electrically conductive coating system of any of paragraphs B1-C9, wherein the elongate body has a/the length, and further wherein the elongate body has an at least substantially constant transverse cross-sectional area across at least a/the threshold fraction of the length.

C11. The electrically conductive coating material of paragraph C10 or the electrically conductive coating system of paragraph C10, wherein the threshold fraction of the length is at least one of at least 10%, at least 20%, at least 30%, at least 40%, at least 50%, at least 60%, at least 70%, at least 80%, at least 90%, at least 95%, or at least 99% of the length.

C12. The electrically conductive coating material of any of paragraphs A1-A4 or C1-C11 or the electrically conductive coating system of any of paragraphs B1-C11, wherein the elongate body is formed from at least one of an electrically conductive material, a metal, gold, silver, platinum, aluminum, tungsten, a carbon fiber, and a conductive polymer.

C13. The electrically conductive coating material of any of paragraphs A1-A4 or C1-C12 or the electrically conductive coating system of any of paragraphs B1-C12, wherein the plurality of electrically conductive elements is spaced-apart within the dielectric layer.

C14. The electrically conductive coating material of any of paragraphs A1-A4 or C1-C13 or the electrically conductive coating system of any of paragraphs B1-C13, wherein the plurality of electrically conductive elements has an areal density of at least one of:

(i) at least 0.01 per square centimeter ($cm^2$), at least 0.05 per $cm^2$, at least 0.1 per $cm^2$, at least 0.15 per $cm^2$, at least 0.2 per $cm^2$, at least 0.3 per $cm^2$, at least 0.4 per $cm^2$, at least 0.5 per $cm^2$, at least 0.6 per $cm^2$, at least 0.7 per $cm^2$, at least 0.8 per $cm^2$, at least 0.9 per $cm^2$, or at least 1 per $cm^2$; and (ii) less than 5 per $cm^2$, less than 4 per $cm^2$, less than 3 per $cm^2$, less than 2 per $cm^2$, less than 1 per $cm^2$, less than 0.8 per $cm^2$, less than 0.6 per $cm^2$, less than 0.4 per $cm^2$, or less than 0.2 per $cm^2$.

C15. The electrically conductive coating material of any of paragraphs A1-A4 or C1-C14 or the electrically conductive coating system of any of paragraphs B1-C14, wherein the elongate body is an elongate conductive body.

C16. The electrically conductive coating material of any of paragraphs A1-A4 or C1-C15 or the electrically conductive coating system of any of paragraphs B1-C15, wherein each of the plurality of electrically conductive elements defines an effective volume and an actual volume, and further wherein the actual volume is less than a threshold fraction of the effective volume.

C17. The electrically conductive coating material of paragraph C16 or the electrically conductive coating system of paragraph C16, wherein the threshold fraction of the effective volume is less than 50%, less than 40%, less than 30%, less than 25%, less than 20%, less than 15%, less than 10%, less than 5%, or less than 1%.

C18. The electrically conductive coating material of any of paragraphs A1-A4 or C1-C17 or the electrically conductive coating system of any of paragraphs B1-C17, wherein the elongate body includes at least one arcuate region.

C19. The electrically conductive coating material of any of paragraphs A1-A4 or C1-C18 or the electrically conductive coating system of any of paragraphs B1-C18, wherein the elongate body includes at least one linear region.

C20. The electrically conductive coating material of any of paragraphs A1-A4 or C1-C19 or the electrically conductive coating system of any of paragraphs B1-C19, wherein the nonlinear conformation defines at least one of:

(i) a pyramidal shape;
(ii) a conic shape;
(iii) a coil;
(iv) a helix;
(v) a spiral;
(vi) a bent circular ring;
(vii) a lobed structure;
(viii) at least one loop; and
(ix) at least one enclosed region.

C21. The electrically conductive coating material of any of paragraphs A1-A4 or C1-C20 or the electrically conductive coating system of any of paragraphs B1-C20, wherein the threshold fraction of the average thickness is at least one of:

(i) at least 50%, at least 60%, at least 70%, at least 80%, at least 90%, at least 100%, or at least 110% of the average thickness of the dielectric layer; and (ii) less than 200%, less than 175%, less than 150%, less than 140%, less than 130%, less than 120%, less than 110%, less than 100%, less than 90%, or less than 80% of the average thickness of the dielectric layer.

C22. The electrically conductive coating material of any of paragraphs A1-A4 or C1-C21 or the electrically conductive coating system of any of paragraphs B1-C21, wherein the threshold fraction of the average thickness is at least one of a substantial fraction of the average thickness and a majority of the average thickness.

C23. The electrically conductive coating material of any of paragraphs A1-A4 or C1-C22 or the electrically conductive coating system of any of paragraphs B1-C22, wherein the electrically conductive base layer is maintained at a predetermined electrical potential.

C24. The electrically conductive coating material of any of paragraphs A1-A4 or C1-C23 or the electrically conductive coating system of any of paragraphs B1-C23, wherein the electrically conductive base layer is grounded.

C25. The electrically conductive coating material of any of paragraphs A1-A4 or C1-C24 or the electrically conductive coating system of any of paragraphs B1-C24, wherein the electrically conductive base layer forms a portion of a substructure.

C26. The electrically conductive coating material of any of paragraphs A1-A4 or C1-C25 or the electrically conductive coating system of any of paragraphs B1-C25, wherein the electrically conductive base layer covers a/the substructure.

C27. The electrically conductive coating material of any of paragraphs C25-C26 or the electrically conductive coating system of any of paragraphs C25-C26, wherein the substructure includes a skin of an aircraft, and optionally wherein the electrically conductive coating system includes the substructure.

C28. The electrically conductive coating material of paragraph C27 or the electrically conductive coating system of paragraph C27, wherein the substructure is an aluminum skin of an aircraft.

C29. The electrically conductive coating material of any of paragraphs C27-C28 or the electrically conductive coating system of any of paragraphs C27-C28, wherein the substructure is a composite skin of an aircraft.

C30. The electrically conductive coating material of any of paragraphs A1-A4 or C1-C29 or the electrically conductive coating system of any of paragraphs B1-C29, wherein the electrically conductive base layer is formed from at least one of a/the electrically conductive material, a/the metal, gold, silver, platinum, aluminum, tungsten, a/the carbon fiber, and a/the conductive polymer.

C31. The electrically conductive coating material of any of paragraphs A1-A4 or C1-C30 or the electrically conductive coating system of any of paragraphs B1-C30, wherein the dielectric layer has an exposed surface.

C32. The electrically conductive coating material of paragraph C31 or the electrically conductive coating system of paragraph C31, wherein at least one of:

(i) the average thickness of the dielectric layer is defined between the exposed surface and the electrically conductive base layer;

(ii) the plurality of electrically conductive elements projects from the exposed surface;

(iii) the plurality of electrically conductive elements forms a portion of the exposed surface;

(iv) the plurality of electrically conductive elements physically contacts the exposed surface;

(v) the plurality of electrically conductive elements penetrates through the exposed surface; and (vi) the plurality of electrically conductive elements extends from the electrically conductive base layer and to the exposed surface.

C33. The electrically conductive coating material of any of paragraphs A1-A4 or C1-C32 or the electrically conductive coating system of any of paragraphs B1-C32, wherein the average thickness of the dielectric layer is at least one of:

(i) at least 5 micrometers, at least 10 micrometers, at least 15 micrometers, at least 20 micrometers, at least 30 micrometers, at least 40 micrometers, at least 50 micrometers, at least 75 micrometers, at least 100 micrometers, at least 150 micrometers, at least 200 micrometers, at least 250 micrometers, at least 500 micrometers, at least 1000 micrometers, at least 1500 micrometers, or at least 2000 micrometers; and (ii) less than 3000 micrometers, less than 2500 micrometers, less than 2000 micrometers, less than 1500 micrometers, less than 1000 micrometers, less than 750 micrometers, less than 500 micrometers, less than 250 micrometers, less than 200 micrometers, less than 150 micrometers, less than 100 micrometers, or less than 50 micrometers.

C34. The electrically conductive coating material of any of paragraphs A1-A4 or C1-C33 or the electrically conductive coating system of any of paragraphs B1-C33, wherein a/the electrically conductive coating material, which includes a/the liquid dielectric and the plurality of electrically conductive elements, is configured to be applied to the electrically conductive base layer via spraying to form the dielectric layer.

D1. A method of forming an electrically conductive coating system, the method comprising:

applying an electrically conductive coating material to an electrically conductive base layer; and curing the electrically conductive coating material to define the electrically conductive coating system.

D2. The method of paragraph D1, wherein the electrically conductive coating material includes the electrically conductive coating material of any of paragraphs A1-A4 or C1-C34.

D3. The method of any of paragraphs D1-D2, wherein the electrically conductive coating system includes the electrically conductive coating system of any of paragraphs B1-C34.

D4. The method of any of paragraphs D1-D3, wherein the electrically conductive coating system includes a/the dielectric layer and a/the plurality of electrically conductive elements, and further wherein the method includes removing at least a portion of the dielectric layer to expose the plurality of electrically conductive elements.

D5. The method of paragraph D4, wherein the removing includes at least one of polishing the electrically conductive coating system, sanding the electrically conductive coating system, and buffing the electrically conductive coating system.

D6. The method of any of paragraphs D1-D5, wherein the applying includes spraying the electrically conductive coating material onto the electrically conductive base layer.

As used herein, the terms "selective" and "selectively," when modifying an action, movement, configuration, or other activity of one or more components or characteristics of a system, mean that the specific action, movement, configuration, or other activity is a direct or indirect result of user manipulation of an aspect of, or one or more components of, the system.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of systems and steps of methods disclosed herein are not required to all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. An electrically conductive coating system, comprising:
   an electrically conductive base layer;
   a dielectric layer that extends across the electrically conductive base layer and has an average thickness; and
   a plurality of electrically conductive elements embedded within the dielectric layer, wherein each of the plurality of electrically conductive elements:
   (i) is defined by an elongate body that has a nonlinear conformation;
   (ii) is in electrical contact with the electrically conductive base layer; and
   (iii) is shaped such that, regardless of an orientation of a given electrically conductive element of the plurality of electrically conductive elements within the dielectric layer, the given electrically conductive element projects from the electrically conductive base layer at least 80% of the average thickness of the dielectric layer.

2. The system of claim 1, wherein each of the plurality of electrically conductive elements is in direct electrical contact with the electrically conductive base layer.

3. The system of claim 1, wherein the elongate body has an aspect ratio of at least 50.

4. The system of claim 1, wherein the elongate body has an effective transverse cross-sectional diameter that is less than 10% of the average thickness of the dielectric layer.

5. The system of claim 1, wherein the elongate body has a length, and further wherein the elongate body has an at least substantially constant transverse cross-sectional area across at least 90% of the length.

6. The system of claim 1, wherein the plurality of electrically conductive elements has an areal density of at least 0.05 per $cm^2$ and less than 0.6 per $cm^2$.

7. The system of claim 1, wherein each of the plurality of electrically conductive elements defines an effective volume and an actual volume, and further wherein the actual volume is less than 10% of the effective volume.

8. The system of claim 1, wherein the nonlinear conformation defines at least one of:
 (i) a pyramidal shape;
 (ii) a conic shape;
 (iii) a coil;
 (iv) a helix;
 (v) a spiral;
 (vi) a bent circular ring;
 (vii) a lobed structure;
 (viii) at least one loop; and
 (ix) at least one enclosed region.

9. The system of claim 1, wherein the electrically conductive base layer at least one of:
 (i) forms a portion of a substructure; and
 (ii) covers the substructure.

10. The system of claim 9, wherein the system includes the substructure, and further wherein the substructure includes a skin of an aircraft.

11. The system of claim 1, wherein the average thickness of the dielectric layer is at least 20 micrometers and less than 2500 micrometers.

12. An electrically conductive coating material for coating an electrically conductive base layer, the electrically conductive coating material comprising:
 a liquid dielectric configured to be applied to the electrically conductive base layer to define a dielectric layer that extends across the electrically conductive base layer and has an average thickness; and
 a plurality of electrically conductive elements suspended within the liquid dielectric, wherein each of the plurality of electrically conductive elements:
 (i) is defined by an elongate body that has a nonlinear conformation; and
 (ii) is shaped such that, regardless of an orientation of a given electrically conductive element of the plurality of electrically conductive elements within the dielectric layer, the given electrically conductive element extends across at least 80% of the average thickness of the dielectric layer.

13. The electrically conductive coating material of claim 12, wherein the liquid dielectric is configured to cure on the electrically conductive base layer to define the dielectric layer.

14. The electrically conductive coating material of claim 12, wherein the liquid dielectric is configured to solidify to define the dielectric layer.

15. The electrically conductive coating material of claim 12, wherein the liquid dielectric includes at least one of a polymeric material, a paint, and an uncured epoxy.

16. The electrically conductive coating material of claim 12, wherein the elongate body has an aspect ratio of at least 50.

17. A method of forming an electrically conductive coating system, the method comprising:
 applying an electrically conductive coating material to an electrically conductive base layer; and
 curing the electrically conductive coating material to define the electrically conductive coating system;
 wherein the electrically conductive coating material includes a liquid dielectric;
 wherein, subsequent to the curing, the liquid dielectric defines a dielectric layer that extends across the electrically conductive base layer and has an average thickness;
 wherein a plurality of electrically conductive elements is suspended within the liquid dielectric during the applying and embedded within the dielectric layer subsequent to the curing; and
 wherein each of the plurality of electrically conductive elements is defined by an elongate body that has a nonlinear conformation and is shaped such that, regardless of an orientation of a given electrically conductive element of the plurality of electrically conductive elements within the dielectric layer, the given electrically conductive element extends across at least 80% of the average thickness of the dielectric layer.

18. The method of claim 17, wherein the method further includes removing at least a portion of the dielectric layer to expose the plurality of electrically conductive elements.

19. The method of claim 18, wherein the removing includes at least one of polishing the electrically conductive coating system, sanding the electrically conductive coating system, and buffing the electrically conductive coating system.

20. The method of claim 17, wherein the elongate body has an aspect ratio of at least 50.

* * * * *